United States Patent [19]

Valka

[11] Patent Number: 5,259,459
[45] Date of Patent: Nov. 9, 1993

[54] SUBSEA WELLHEAD TIEBACK CONNECTOR

[75] Inventor: William A. Valka, Spring, Tex.

[73] Assignee: FMC Corporation, Chicago, Ill.

[21] Appl. No.: 695,634

[22] Filed: May 3, 1991

[51] Int. Cl.$^5$ ............................................. E21B 23/00
[52] U.S. Cl. ................................. 166/345; 166/217; 166/237; 166/359; 285/141
[58] Field of Search ............... 166/341, 344, 345, 348, 166/382, 217, 237, 359; 285/18, 24, 39, 141, 920

[56] References Cited

U.S. PATENT DOCUMENTS

| | | |
|---|---|---|
| 4,456,070 | 6/1984 | Watkins ............................ 166/345 |
| 4,465,134 | 8/1984 | Watkins ............................ 166/245 |
| 4,474,236 | 10/1984 | Kellett ............................ 166/348 X |
| 4,519,633 | 5/1985 | Nichols ............................ 166/217 X |
| 4,681,166 | 7/1987 | Cuiper ............................ 166/345 |
| 4,696,493 | 9/1987 | Brammer ............................ 166/345 X |
| 4,757,860 | 7/1988 | Reimert ............................ 166/208 |
| 4,872,708 | 10/1989 | Abreo ............................ 285/39 |
| 4,919,454 | 4/1990 | Caulfield et al. ............. 405/224.2 X |
| 4,941,691 | 7/1990 | Reimert ............................ 285/39 |
| 4,976,458 | 12/1990 | Hosie ............................ 285/24 |

FOREIGN PATENT DOCUMENTS

| | | |
|---|---|---|
| 1197680 | 7/1970 | United Kingdom . |
| 2111625 | 7/1983 | United Kingdom . |
| 2162919 | 2/1986 | United Kingdom . |
| 2165908 | 4/1986 | United Kingdom . |

Primary Examiner—Ramon S. Britts
Assistant Examiner—Roger J. Schoeppel
Attorney, Agent, or Firm—Lawrence Cruz; Richard B. Megley

[57] ABSTRACT

A subsea wellhead tieback connector actuated solely by axial motion to achieve connection to and disconnection from the wellhead. The connector includes interconnected inner and outer bodies, a split lock ring surrounding the inner body, and an energizing mandrel for non-rotary axial movement to expand the lock ring into engagement with a wellhead component.

9 Claims, 2 Drawing Sheets

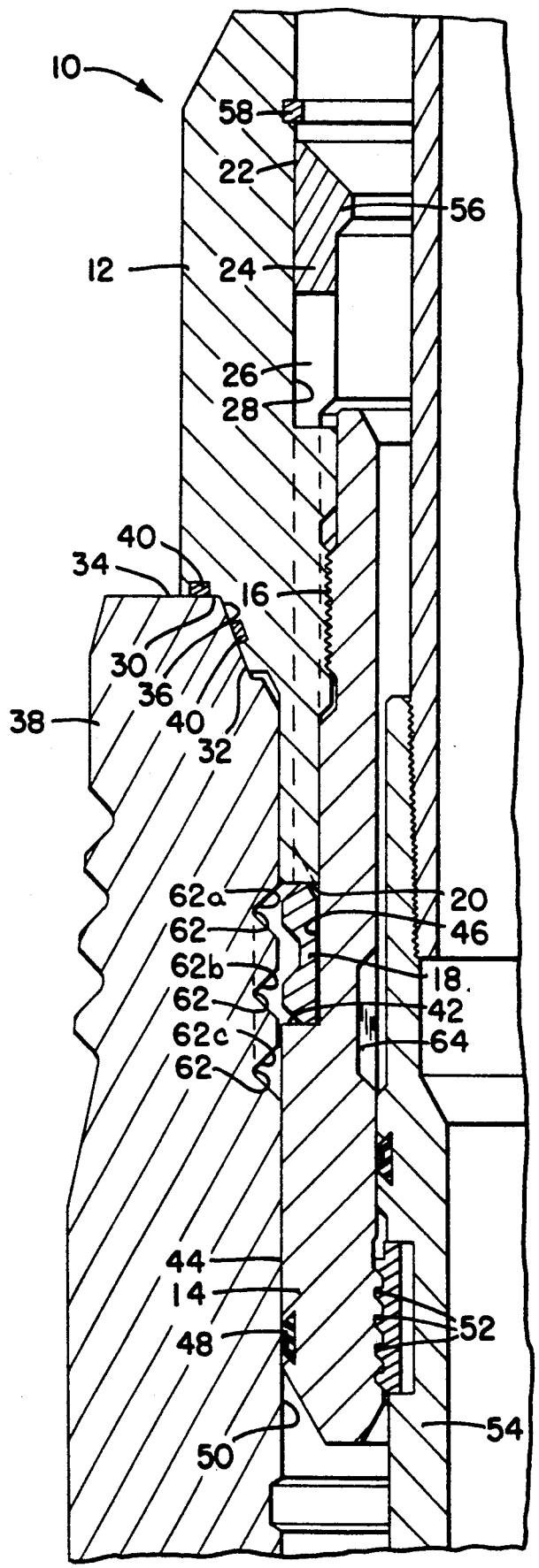
FIG_1
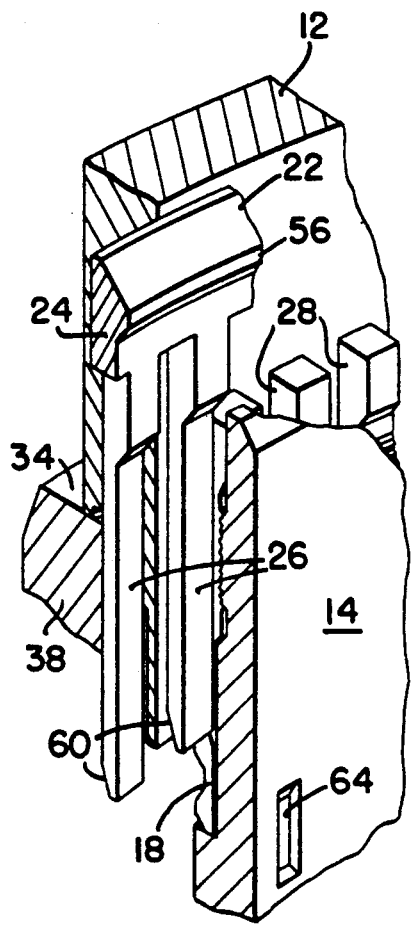
FIG_3

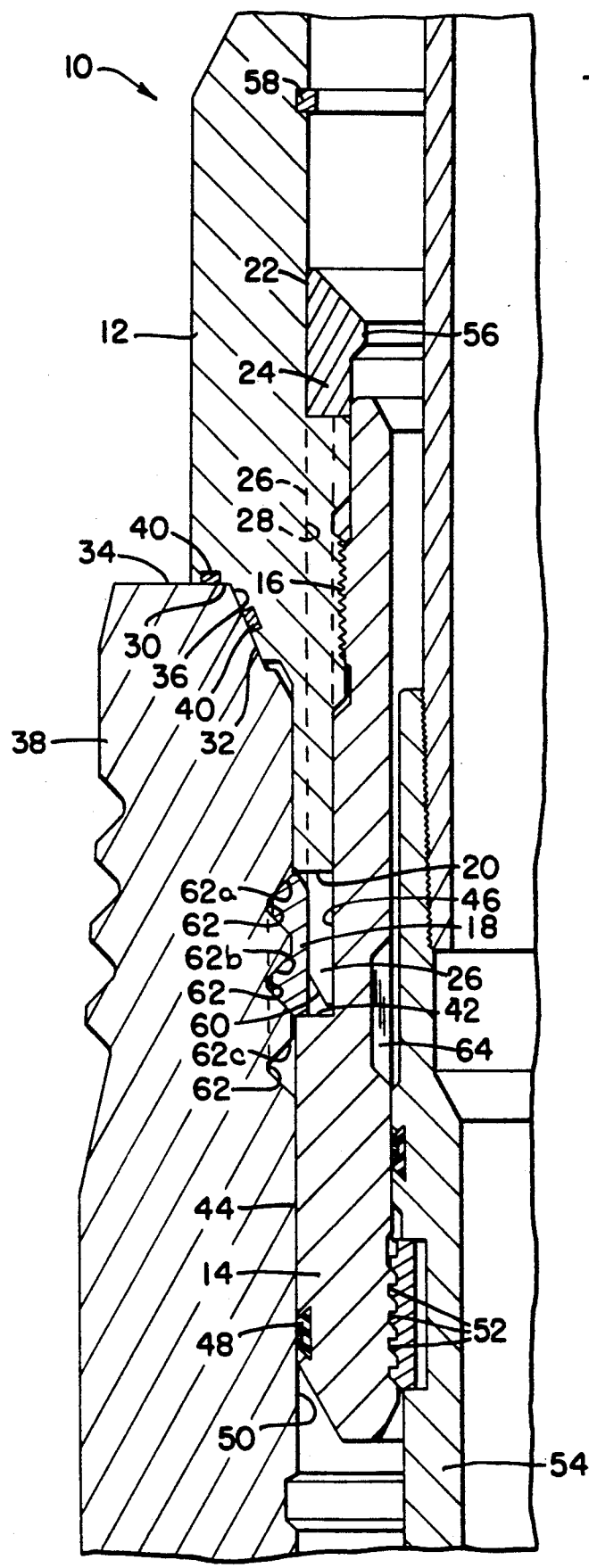
FIG_2

SUBSEA WELLHEAD TIEBACK CONNECTOR

BACKGROUND OF THE INVENTION

This invention relates to subsea well equipment, and more particularly to equipment, referred to as tieback connectors, used to interconnect well conductor or riser pipe with a wellhead beneath the water surface.

For many years the petroleum industry has been producing oil and gas from offshore wells wherein the wellhead is located underwater, i.e. subsea, and the Christmas tree is positioned on a platform or other surface facility. Extending between these subsea wellheads and their surface trees are relatively large diameter conductor or riser pipes that are attached to the wellhead housings by tieback connectors that require rotation of a pipe string to lock them to, and release them from, the housings. Although right-hand rotation of the pipe string during the locking procedure usually presents no problem, when the string is rotated to the left to unlock the connector the joints in the string can unthread, and reconnecting those joints presents a serious and costly problem to the operator.

SUMMARY OF THE INVENTION

The present invention solves the foregoing problem by providing a tieback connector that is actuated by axial motion to achieve proper connection to, and disconnection from, a wellhead. No rotary motion is required for these operations, and therefore the danger of drill pipe unthreading is eliminated.

A tieback connector according to the present invention comprises a tubular outer body with means, such as threads, for attaching it to a pipe string, a tubular inner body within and connected to the outer body, an axially split lock ring surrounding the inner body beneath the lower end of the outer body, and an annular energizing mandrel between the inner and outer bodies to expand the lock ring from an inherently contracted position into an annular groove system in the wellhead housing or other component with which the tieback connection is to be made. The energizing mandrel has a continuous body portion from which downwardly extend a plurality of circumferentially spaced elongated fingers that reside in internal axial slots in the outer body bore, the fingers terminating above the lock ring when the mandrel is in its upper or "unlocked" position, and residing behind the expanded ring when in its lower or "locked" position to hold the ring in functional position in the housing groove system. The connection between the inner and outer bodies of the connector facilitates assembly and, if needed, position adjustment of the connector components, and an optional axial slot in the bore of the inner body enables rotation of that body with respect to the other connector components to apply a load on the ring after it has been expanded into functional locking position.

Further features and advantages of the present invention will become apparent from the following description in combination with the accompanying drawings.

BRIEF DESCRIPTION OF THE DRAWINGS

FIG. 1 is a fragmentary central section through a tieback connector according to the present invention, showing the connector landed in the upper end portion of a wellhead housing and ready for actuation from its unlocked to its locked condition.

FIG. 2 is a view like FIG. 1, showing the tieback connector locked into the wellhead housing.

FIG. 3 is a fragmentary isometric view of the unlocked connector and housing of FIG. 1, showing the energizing mandrel fingers in their axial slots in the outer body of the connector.

DESCRIPTION OF THE PREFERRED EMBODIMENT

As illustrated in the drawings, a tieback connector 10 according to the present invention comprises a tubular outer body 12, a tubular inner body 14 connected to the outer body 12 such as by threads 16 or other suitable means, a split lock ring 18 surrounding the inner body 14 below the lower end surface 20 of the outer body 12, and an energizing mandrel 22 having an upper annular body portion 24 and a plurality of circumferentially spaced elongated fingers 26 extending downwardly from the body 24 in axial slots 28 in the bore of the outer body 12.

The outer body 12 has an external annular downwardly-facing shoulder 30 and a frusto-conical surface 32 that seat on complementary surfaces 34, 36, respectively, on a wellhead housing 38 when the connector 10 is properly landed on the housing, and annular seals 40 provide a pressure-tight seal between the outer body 12 and housing 38. The inner body 14 has an upwardly-facing annular shoulder 42 between its lower outer surface 44 and its upper reduced diameter surface 46, and this shoulder 42, the surface 46 and the outer body lower end surface 20 cooperatively form an annular recess in which the lock ring 18 resides (FIG. 1). The inner body 14 carries an outer annular seal 48 for sealing the body to the interior surface 50 of the wellhead housing 38, and ratch-a-latch grooves 52 in its bore for connection to an inner casing element 54.

The body 24 of the energizing mandrel 22 has an inwardly oriented annular flange 56 for connecting the mandrel to a tool (not shown) to axially move the mandrel between its upper and lower positions as shown in FIGS. 1 and 2, respectively, and the mandrel is retained in the outer body 12 by a snap ring 58. The lower ends of the mandrel fingers 26 are tapered at 60 to facilitate their passage behind the lock ring 18 as the mandrel is moved downward to expand the lock ring from its "unlocked" or contracted position shown in FIG. 1, into its "locked" or expanded position as seen in FIG. 2.

The lock ring 18 has an outer surface profile complementary with a groove profile in the internal surface 50 of the wellhead housing 38, such as the grooves 62 as seen in FIGS. 1 and 2. Thus when the ring 18 is expanded into two of the grooves 62 (FIG. 2) it effectively prevents the tieback connector 10 from moving upward with respect to the housing 38, thereby locking the connector to the housing.

By adjusting the axial spacing between the inner body radial surface 42 and the upper frusto-conical surfaces 62a-c of the grooves 62, a pre-load can be imposed through the ring and onto the connector, such adjusting being accomplished by means of the threads 16 interconnecting the inner and outer bodies 14, 12. If pre-load adjustment is needed or desired after the connector has been run, an axial slot 64 can be included in the bore of the inner body 14 to provide a means for connecting a tool (not shown) to rotate the inner body with respect to the outer body 12, thereby causing axial movement of the inner body surface 42.

Although the best mode contemplated for carrying out the present invention has been herein shown and described, it will be apparent that modification and variation may be made without departing from what is regarded to be the subject matter of the invention.

What is claimed is:

1. A tieback connector for use in connecting a riser, conductor or other well pipe to a subsea wellhead, said connector comprising:
   (a) a tubular outer body with a bore, an upper end, a lower end surface, and a plurality of axial slots in said bore;
   (b) means for attaching the outer body to a well pipe;
   (c) a tubular inner body;
   (d) means for interconnecting the inner and outer bodies;
   (e) a split lock ring surrounding the inner body beneath the lower end surface of the outer body;
   (f) an annular lock ring energizing mandrel between the inner and outer bodies for axial non-rotary movement between upper and lower positions to expand the lock ring into locking engagement with a wellhead component and thereby connect the tieback connector to said component; and
   (g) means for rotating the inner body with respect to the outer body causing axial movement of the inner body in order to establish a preload on the lock ring when the lock ring is in locking engagement.

2. A tieback connector according to claim 1 wherein the inner body has a lower outer axial surface, an upper outer axial surface of less diameter than said lower surface, and an upwardly-facing annular shoulder formed by a generally radial surface extending between said lower and upper surfaces.

3. A tieback connector according to claim 2 wherein the inner body radial surface and upper outer axial surface cooperate with the lower end surface of the outer body to form an annular recess within which the lock ring resides in contracted position.

4. A tieback connector according to claim 1 wherein the energizing mandrel comprises a continuous body portion and a plurality of elongated fingers extending downwardly from said body portion and within the outer body slots.

5. A tieback connector according to claim 4 wherein the elongated fingers are spaced circumferentially with respect to the mandrel body portion and terminate in tapered lower ends.

6. A tieback connector according to claim 1 wherein downward axial movement of the mandrel causes the mandrel fingers to expand the lock ring into its functional locking engagement with the wellhead component.

7. A tieback connector according to claim 1 wherein the mandrel includes means for connecting it to a well tool to actuate the mandrel in an axial non-rotary direction.

8. A tieback connector according to claim 1 wherein the inner body includes means for connecting a well tool to said inner body for adjusting the relative axial positions of the inner and outer bodies.

9. A tieback connector according to claim 1 wherein the means for interconnecting the inner and outer bodies comprises threads.

* * * * *